United States Patent

[11] 3,567,980

| [72] | Inventor | Kenneth G. Kreuter |
| | | Goshen, Ind. |
| [21] | Appl. No. | 796,072 |
| [22] | Filed | Feb. 3, 1969 |
| [45] | Patented | Mar. 2, 1971 |
| [73] | Assignee | Robertshaw Controls Company |
| | | Richmond, Va. |

[54] REVERSIBLE MOTOR WITH AXIALLY MOVEABLE ROTOR
8 Claims, 4 Drawing Figs.

[52] U.S. Cl. .................................................. 310/209,
310/75, 310/261
[51] Int. Cl. ...................................................... H02k 7/12
[50] Field of Search ........................................... 310/209,
211, 156, 261, 75, 83

[56] References Cited
UNITED STATES PATENTS

| 3,233,135 | 2/1966 | Holzer | 310/209 |
| 3,163,791 | 12/1964 | Carlson | 310/209X |
| 2,869,008 | 1/1959 | Carlsen | 310/209 |
| 2,760,092 | 8/1956 | Galinski | 310/209X |
| 3,375,384 | 3/1968 | Thees | 310/156 |

*Primary Examiner*—Milton O. Hirshfield
*Assistant Examiner*—B. A. Reynolds
*Attorneys*—Candor, Candor and Tassone, Auzville Jackson, Jr. and Robert L. Marben ABSTRACT: A reversible motor means having a stator provided with an opening means passing therethrough and receiving a rotor that is normally disposed in one position thereof that is in axially offset relation to the stator when the motor is deenergized, the rotor means having laminations thereon so constructed and arranged that when the motor means is energized, the rotor is pulled into centrally aligned relation with the stator and will remain in such centrally aligned relation even if, thereafter, the motor is reversed so as to drive the rotor in the opposite direction without causing the rotor to return to the one position thereof.

PATENTED MAR 2 1971　　　3,567,980

INVENTOR.
KENNETH G. KREUTER

BY
Cauden & Cauden

HIS ATTORNEYS

REVERSIBLE MOTOR WITH AXIALLY MOVEABLE ROTOR

This This invention relates to an improved reversible motor means as well as to a system utilizing such a motor means or the like, this invention also relating to the method of making such a motor means or the like.

It is well known that various reversible motors have been provided in the past wherein the rotor and stator thereof are so constructed and arranged that when the motor means is deenergized, the rotor is in an offset relation relative to the stator and is not pulled into axial alignment with the stator by a solenoid action until the motor means is energized, such solenoid action of the rotor means being utilized to clutch the motor to a driven member to drive the same only when the motor means is energized.

However, such prior known motor means when once energized to pull the rotor into axially aligned relation with the stator caused the rotor means to move back to its offset relation when the operator or the like reversed the motor means to drive the driven member in the opposite direction so that a continuous transfer from one direction of drive to the other direction of drive could not be accomplished.

According to the teachings of this invention, however, an improved reversible motor means of the above type has been provided wherein the rotor thereof will not return to its offset position shoulder should the operator reverse the motor means during the operation thereof.

In particular, one embodiment of this invention provides a reversible motor means wherein the rotor is normally maintained in an offset relation in the opening means of the stator when the motor means is deenergized and is pulled into axially aligned relation with the stator by a solenoid action when the motor is energized, the rotor of this invention having a lamination stack formed of a plurality of lamination discs of thin cross section and two laminations of relatively thick cross section so arranged that one of the thick laminations is disposed at one end of the lamination stack and the other thick lamination is disposed inboard of the other end of the lamination stack so as to create a constant magnemotive force which maintains the rotor in centrally aligned relation with the stator even though the motor means is subsequently reversed in the direction of operation thereof.

Accordingly, it is an object of this invention to provide an improved reversible motor means having one or more of the novel features set forth above or hereinafter shown or described.

Another object of this invention is to provide an improved system utilizing such a motor means or the like, the system of this invention having one or more of the novel features set forth above or hereinafter shown or described.

Another object of this invention is to provide an improved method for making such a motor means or the like, the method of this invention having one or more of the novel features set forth above or hereinafter shown or described.

Other objects, uses and advantages of this invention are apparent from a reading of this description which proceeds with reference to the accompanying drawings forming a part thereof and wherein.

Figure 1:
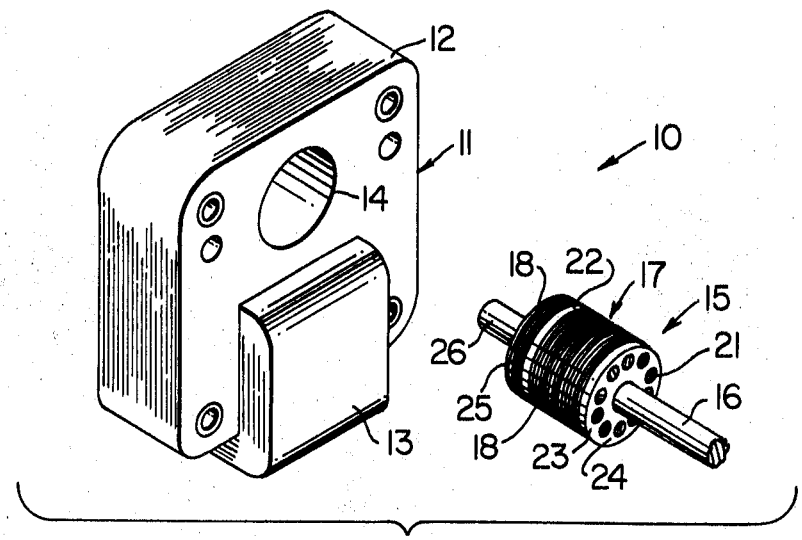
FIG. 1 is an exploded perspective view of the rotor and stator of the improved reversible motor means of this invention.

While the various features of this invention are hereinafter described and illustrated as providing a reversible motor means for clutching and declutching to a driven device, it is to be understood that the various features of this invention can be utilized singly or in any combination thereof to provide reversible motor mans for other types of systems as desired.

Therefore, this invention is not to be limited to only the embodiment illustrated in the drawings because the drawings are merely utilized to illustrate one of the wide variety of uses of this invention.

Referring now to FIG. 1, the improved reversible motor means of this invention is generally indicated by the reference numeral 10 and is generally indicated by the reference of the well-known shaded pole type except for the changes made therein according to the teachings of this invention and hereinafter described, the reversible motor means 10 comprising a stator 11 formed from a plurality of metallic sheets 12 disposed together in stacked relation in a conventional manner and being provided with an electrical coil 13 in a conventional manner. The stator 11 has an opening means 14 passing therethrough to telescopically receive a squirrel cage rotor 15 that comprises a rotor shaft 16 carrying a lamination stack 17 thereon.

The lamination stack 17 of the rotor 15 of this invention comprises a plurality of thin metal discs 18 having a central opening 19 passing therethrough to permit the discs 18 to be telescopically disposed on the rotor shaft 16, each disc 18 having a plurality of circumferentially arranged apertures 20 passing therethrough to receive the conductor means 21 in a conventional manner to form the squirrel cage rotor 15. In addition, the lamination stack 17 of the rotor means 15 of this invention includes two relatively thick metallic discs 22 and 23 of brass or the like which in prior known squirrel cage rotor constructions are respectively disposed at the opposed ends of the rotor stack, the thick discs 22 and 23 also having the central openings 19 and circumferentially arranged apertures 20 for the purposes previously described.

However, it has been found, according to the teachings of this invention, that when one of the thick discs 23 is disposed at one end 24 of the rotor stack 27 and the other thick disc 22 is disposed inboard of the other end 25 of the rotor stack 17 so as to be axially displaced from the end 25 of the rotor stack 17 by several of the thin metal discs 18 and also be axially spaced from the other thick disc 23 by the remaining thin discs 18, the rotor 15 of this invention will be maintained in a centrally aligned relation in the opening means 14 of the stator 11 when the motor means 10 has been energized and is then reversed to cause reverse rotation of the rotor 15.

Figure 2:
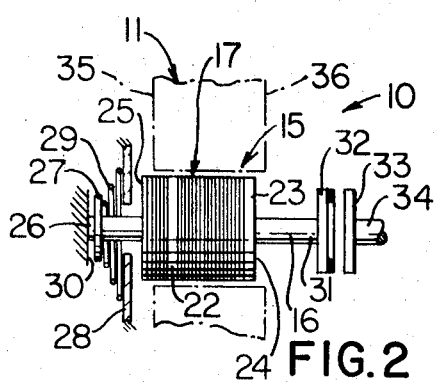
FIG. 2 is a side view of the rotor of the motor means of this invention utilized in the system of this invention, the stator being partially shown in phantom lines.

In particular, the lamination stack 17 is arranged on the rotor shaft 16 of the rotor means 15 of this invention in the manner illustrated in FIG. 1 and any suitable means are provided so as to tend to maintain the rotor 15 in the normally axially offset relation relative to the stator 11 as illustrated in FIG. 2 when the coil 13 of the stator 11 is in a deenergized condition.

For example, the left-hand end 26 of the rotor shaft 16 can carry an abutment disc 27 and the motor means 10 can be arranged relative to a stationary frame means 28 so that a compression spring 29 disposed between the stationary frame means 28 and the abutment disc 27 on the rotor shaft 16 will tend to maintain the rotor 15 in the axially offset relation relative to the stator 11 against a fixed stop 30 when the coil means 13 of the motor means 10 is deenergized.

Figures 3, 4:
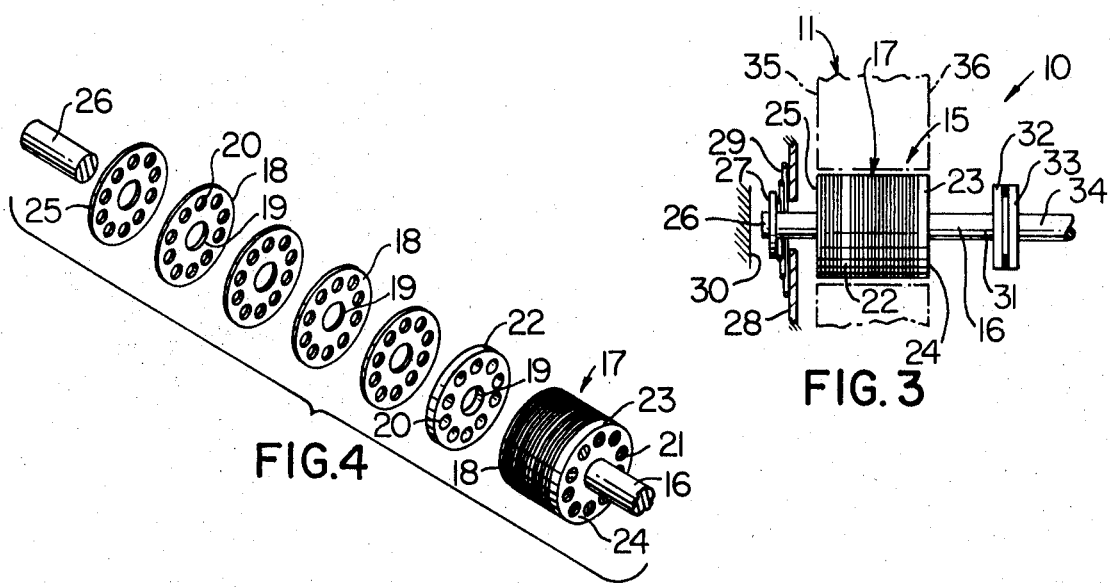
FIG. 3 is a view similar to FIG. 2 and illustrates the rotor in its operating condition.
FIG. 4 is an exploded perspective view of certain parts of the rotor of this invention.

The right-hand end 31 of the rotor shaft 16 can carry a clutch member 32 that is adapted to clutch with a cooperating clutch member 33 of a driven device or shaft 34 only when the rotor 15 is moved to the position illustrated in FIG. 3 whereby it can be seen that when the motor means 10 is in its deenergized condition of FIG. 2, the compression spring 29 maintains the clutch parts 32 and 33 completely separated from each other.

Because the thick disc 22 of the rotor stack 17 is disposed inboard of the end 25 of the rotor 15 that normally projects out of the left-hand side or end 35 of the stator 11 as illustrated in FIG. 2, the subsequent energizing of the coil 13 of the stator 11 causes a solenoid action to take place on the rotor means 15 so that the same is drawn axially into centrally aligned relation with the stator 11 as illustrated in FIG. 3 wherein the opposed ends 25 and 24 of the rotor 15 are disposed in substantially aligned relation with the opposed ends 35 and 36 of the stator 11 with the clutch part 32 of the rotor shaft 16 being disposed in clutching relation with the clutch part 33 of the driven device 34 so that the energized motor means 10 will drive the rotor 15 in a particular direction as the coil means 13 is energized in a certain manner so that the driven device 34 will be driven in unison with the rotor 15. During such operation of the motor means 10 of this invention wherein the rotor shaft 15 is clutched to the driven device 34, the operator can cause reversing of the motor means 10 in a conventional manner by changing the current flow through the coil 13 in a conventional manner and it has been found that the rotor stack arrangement 17 of the rotor means 15 of this invention in combination with the stator 12 produces a constant magnemotive force that maintains the rotor 15 in the centrally aligned relation illustrated in FIG. 3 during such reversing of the motor means 10 so that the rotor 15 remains clutched to the driven device 34 and then when the rotor 15 begins to rotate in the opposite direction, the driven device 34 moves in unison therewith in such opposite direction.

However, should the lamination stack 17 of the rotor 15 have the thick discs 23 and 22 thereof respectively arranged at the opposed ends 24 and 25 of the rotor stack 17 as in the prior art, so that the thick discs 22 and 23 are respectively disposed in aligned relation with the opposed sides 35 and 36 of the stator 11 when the rotor is disposed in the pulled-in centrally aligned condition of FIG. 3, a reversing of the motor means 10 in the manner previously described permits the spring 29 to move the motor 15 back to the declutched position of FIG. 2 until the reversed motor means 10 again accomplishes a solenoid action on the rotor 15 to pull the same into the position illustrated in FIG. 3 whereby a clutched transition from one rotational direction of the rotor of the prior art motor means to the opposite rotational direction cannot be obtained.

Therefore, it can be seen that by practicing the teachings of this invention and moving the outboard thick disc at the end of the rotor that is normally projecting out of the opening means of the stator when the motor means is deenergized and moving that thick disc inboard of that end so that certain of the thin laminations are disposed outboard of that particular thick disc, the resulting arrangement functions in the manner previously described so that the rotor 15 is maintained in its pulled-in condition of FIG. 3 even though the motor means 10 is being subsequently reversed by the operator to drive the shaft 34 in the opposite direction from the previously driven direction thereof.

For example, such holding action of the rotor means 15 of this invention in its clutching relation with the driven device 34 during a reversing operation of the motor means 10 in the manner previously described permits the motor means 10 of this invention to be readily utilized for controlling a sequence operation without having inertia change the rotational relationship between the clutch parts 32 and 33 during a reversing of the direction of operation thereof through a reversing of the operation of the motor means 10.

Accordingly, it can be seen that not only does this invention provide an improved reversing motor means and method of making the same, but also this invention provides an improved system utilizing such a reversing motor means or the like.

I claim:

1. A reversible motor means comprising a stator having an opening means passing therethrough, and a rotor disposed in said opening means, said rotor normally being disposed in one position in axial offset relation with said stator in said opening means thereof when said motor means is in its deenergized condition and being pulled axially into centrally aligned relation in said opening means of said stator when said motor is energized, said rotor having means for maintaining said rotor in said centrally aligned relation when said motor means is energized and driving said rotor in one direction and then is reversed to drive said rotor in the opposite direction without causing said rotor to return to said one position thereof, said rotor having a shaft carrying a plurality of axially aligned disc laminations thereon to form a lamination stack on said shaft, certain of said laminations being relatively thin in cross section and two of the laminations being relatively thick in cross section in relation to said certain laminations to provide said means for maintaining said rotor in said centrally aligned relation, one of said thick laminations being disposed at one end of said lamination stack and the other thick lamination being disposed inboard of the other end of said lamination stack, said rotor having a plurality of circumferentially disposed conductor means passing through all of said laminations of said stack and securing said laminations together.

2. A reversible motor means as set forth in claim 1 wherein said other end of said lamination stack projects out of said opening means of said stator when said rotor is in said one position thereof.

3. A reversible motor means as set forth in claim 2 wherein said stator has opposed ends and wherein said ends of said rotor are aligned with said opposed ends of said stator when said rotor is in said centrally aligned relation with said stator.

4. A reversible motor means as set forth in claim 3 wherein said two thick laminations are axially spaced from each other by some of said thin laminations in said lamination stack.

5. In combination, a driven device, a reversible motor means for driving said device, said motor means having a stator provided with an opening means passing therethrough, said motor means having a rotor disposed in said opening means, and means operatively associated with said rotor to maintain said rotor in one position thereof that is in axially offset relation in said opening means of said stator when said motor means is in its deenergized condition, said rotor being pulled axially into centrally aligned relation in said opening means of said stator when said motor is energized, said rotor and said driven device having means for coupling said rotor and said driven device together only when said rotor is in said centrally aligned relation with said stator so that said device can be driven by said rotor, said rotor having means for maintaining said rotor in said centrally aligned relation when said motor means is energized and driving said rotor in one direction and then is reversed to drive said rotor in the opposite direction without causing said rotor to return to said one position thereof, said rotor having a shaft carrying a plurality of axially aligned disc laminations thereon to form a lamination stack on said shaft, certain of said laminations being relatively thin in cross section and two of the laminations being relatively thick in cross section in relation to said certain laminations to provide said means for maintaining said rotor in said centrally aligned relation, one of said thick laminations being disposed at one end of said lamination stack and the other thick lamination being disposed inboard of the other end of said lamination stack, said rotor having a plurality of circumferentially disposed conductor means passing through all of said laminations of said stack and securing said laminations together.

6. A combination as set forth in claim 5 wherein said other end of said lamination stack projects out of said opening means of said stator when said rotor is in said one position thereof.

7. A combination as set forth in claim 6 wherein said stator has opposed ends and wherein said ends of said rotor are aligned with said opposed ends of said stator when said rotor is in said centrally aligned relation with said stator.

8. A combination as set forth in claim 7 wherein said two thick laminations are axially spaced from each other by some of said thin laminations in said lamination stack.

75